July 7, 1964  C W. MUSSER  3,139,770
DRIVE MECHANISM INCLUDING SELF-COMPENSATING WAVE GENERATOR
Filed Aug. 14, 1962  3 Sheets—Sheet 1

Inventor
C Walton Musser
By his Attorney

United States Patent Office 3,139,770
Patented July 7, 1964

3,139,770
DRIVE MECHANISM INCLUDING SELF-COMPENSATING WAVE GENERATOR
C Walton Musser, Palos Verdes Estates, Calif., assignor to United Shoe Machinery Corporation, Flemington, N.J., a corporation of New Jersey
Filed Aug. 14, 1962, Ser. No. 216,795
21 Claims. (Cl. 74—798)

The present invention relates to a drive mechanism of the harmonic drive rotary-to-rotary type.

A purpose of the invention is to make the running torque of a drive mechanism such as a speed reduction unit generally responsive to output torque.

A further purpose is to increase the pressure of engagement between frictional drive elements as the output torque increases and reduce such pressure of engagement as the output torque decreases.

A further purpose is to obtain a very small input torque under normal output loads, but permit increase of the input torque when required by increase in output loads.

Further purposes appear in the specification and in the claims.

In the drawings I have chosen to illustrate a few only of the numerous embodiments in which the invention may appear, selecting the forms shown from the standpoints of convenience in illustration, satisfactory operation and clear demonstration of the principles involved.

Figure 1:
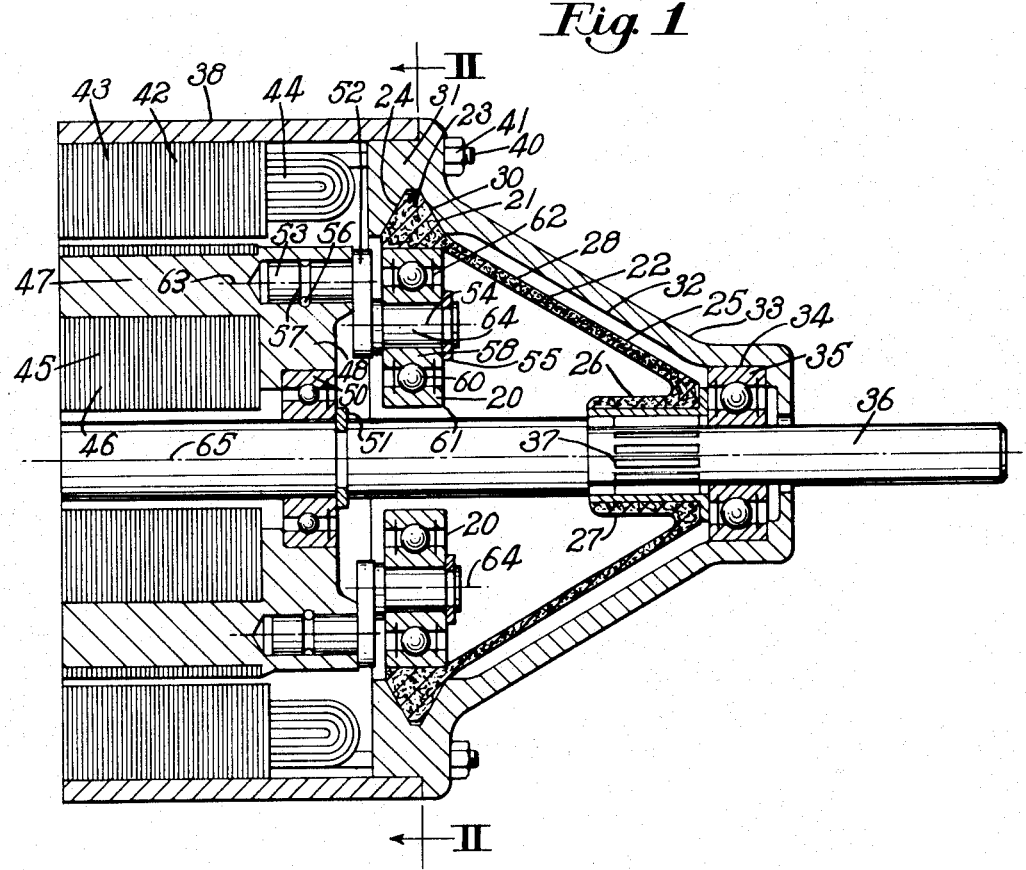
FIGURE 1 is a half section of a gear motor employing a drive in accordance with the invention, the section being taken on the axis of the output.

The invention provides a wave generator for a harmonic drive which increases in diameter as the output torque is increased.

It is primarily intended for use in a harmonic drive rotary-to-rotary mechanism such as a reduction unit and is believed to have its greatest usefulness in a unit in which a flexible element is in frictional contact with a rigid circular element. For the general concept of harmonic drive, the reader is referred to my United States Patent 2,906,143.

It is intended in the device of the invention to make the wave generator, which produces frictional engagement between the flex element and the circular element, be self-compensating or self-energizing. As the output torque of the unit is increased, this will increase the diameter of the wave generator and as a consequence will increase the force or contact pressure between the flex element and the circular element.

One of the simplest examples of a self-energizing or self-compensating drive is a common V belt. Here the wrap around of the belt in the pulley will in itself provide a certain amount of tensional pull in the belt and the angle of the V or bevel surfaces of the pulley will be so selected that the belt, due to its tensional load, will be drawn down deeper into the pulley so that it is self-locking with the sides of the pulleys as torque increases. The parameters are so selected that the belt is essentially self-locking with the pulley.

It is possible to adapt some of the principles of harmonic drive to frictional driving surfaces. In order to acomplish this, however, it is necessary that the wave generator hold the flex element into frictional engagement with the circular element under a force that is sufficient to prevent slippage even when the maximum allowable torque is applied. In most frictional drives, the frictional elements are always under a pressure which prevents slippage at the maximum allowable torque, and consequently such elements have a high no-load running torque. By loading up the frictional surfaces to prevent them from slipping at the maximum output torque, these surfaces are normally deflected or deformed as they are running together under the load which is demanded by the maximum output torque, and this condition prevails even when they are running at lesser torque. In a prior art device of this type, if the expected output torque is appreciably exceeded, the frictional contacting surfaces will slip over one another, and quite frequently will seize, gall or abrade so as to ruin the frictional surfaces.

In the device of the present invention, the output torque is used to determine the loading of the frictional engaging surfaces. Consequently the force at the frictional surfaces will be in excess of that necessary to guarantee against slippage, regardless of the output torque. When designed in this manner, the device is completely self-locking under any force applied to the output shaft within the operating range.

The device of the invention also has the advantage that there is relatively small input torque when the output torque is normal and not excessive. This is because the frictional engaging surfaces under zero output torque are very lightly loaded.

No attempt has been made in the present disclosure to illustrate conventional aspects of V drives, including the relative axial adjustment of the outer V surfaces toward one another so as to compensate for tolerance in manufacture and wear. Such adjustments are already well known in V belt pulleys.

FIGURE 1 shows the invention incorporated in one end of an electric motor. Only one end of the motor is shown. It will be evident that the other end of the motor can either be a conventional design or it can be an exact replica of the half of the motor shown in FIGURE 1. Thus the lefthand side of FIGURE 1 may be the vertical centerline of the motor. It will be evident that where the device of the invention is provided at both ends of the motor, the output torque can be considerably greater than it would be for a single-ended arrangement since both ends will produce output torque.

Wave generator rollers 20, which may be conventional ball or roller bearings, roll around the inner surface 21 of a flexible element or flexcone 22. The flexcone 22 at the larger end has a ring-like flexible enlarged portion 23 which is similar to a V belt turned inside out in the embodiment shown. This enlarged portion 23 has two opposed sides 24 which are of beveled shape in the manner familiar in a V belt.

The flexcone 22 has a conical side wall 25 which connects the enlarged end 23 with a cylindrical hub portion 26. The cylindrical hub portion 26 is desirably united as by molding or cementing to a metallic splined bushing 27.

The flexcone 22 is suitably composed of an elastomer such as neoprene or butyl rubber or nylon, and it will desirably be reinforced by a fibrous material 28 which may be put in as individual fibers or as a network or a fabric, and will suitably consist of nylon, rayon, steel or other suitable material.

At the major diameter the enlarged end 23 of the flexcone 22 has its beveled sides 24 in intimate contact with the circular walls of the groove 30 of a rigid circular element 31 which is in the end bell 32 of the electric motor shown. This circular groove 30 has internal opposed beveled sides which match external beveled sides 24 of the flexcone at the major diameter.

Figure 2:
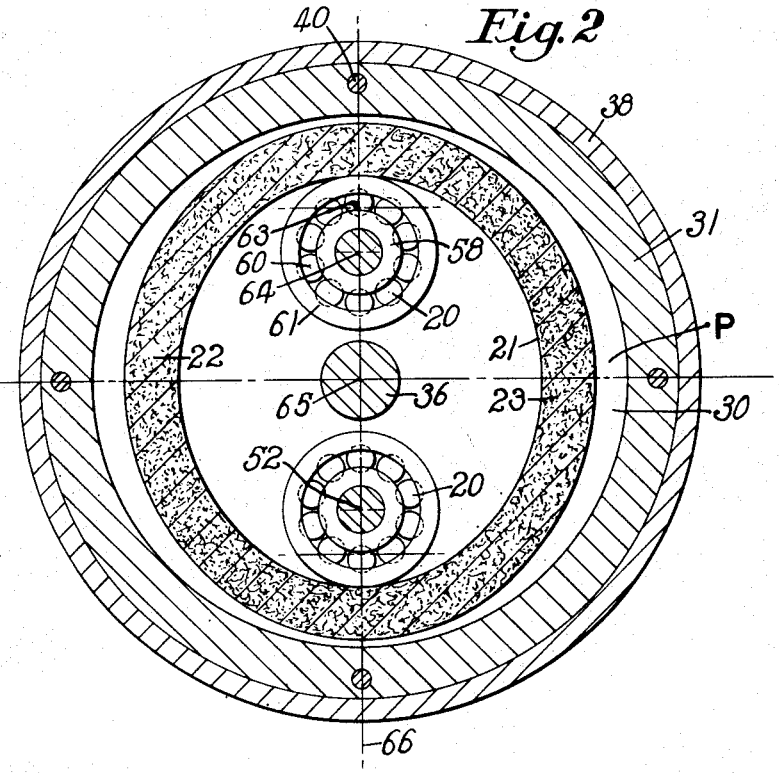
FIGURE 2 is a section of FIGURE 1 on the line II—II.

In the particular embodiment shown, the flexible element is in contact with the interior of the circular element at two diametrally opposed positions, although it will be evident that three or more equally circumferentially spaced points of engagement between the flexible element and the circular element may be obtained. In any case, the flexible element is out of contact with the circular element at points in between these points of engagement and this will be evident from FIGURE 2 at points P adjacent the minor axis. The rollers 20 of the wave generator in the preferred embodiment deflect the flexible element 23 into a more or less elliptoidal shape having a major axis and a minor axis as shown in FIGURE 2, and as the wave generator rollers 20 turn in a manner to be described, the major and minor axes rotate and the shape of the elliptoid rotates. This action will be apparent from my patent above referred to.

The end bell 32 of the motor has a conical portion 33 which interconnects with a bearing housing 34 which mounts a bearing 35, suitably a ball or roller bearing, which journals output shaft 36 which is coaxial with respect to the flexible element 23 and also the circular element 31. The output shaft has splines 37 which intermate with the splines in the spline bushing 27, thus keying the output shaft 36 to the flexcone 22. While it is convenient to bond the flexcone to the spline bushing 27 and spline this to the output shaft, it is to be noted that this is merely a suggested method of manufacture and of course the flexcone can be bonded directly to the output shaft if desired.

In the embodiment shown the reduction unit is housed within the end of the motor. The motor has a motor housing 38 which is fastened to the end belts 32 by bolts 40 and nuts 41. Within the motor housing 38 there is a stator or field 42 having stator magnetic laminations 43 and a stator winding 44. Inside the stator there is a rotor or armature 45 having rotor magnetic laminations 46 and rotor conductors 47 which are suitably cast in place with the conductor end 48 as is well known in squirrel cage induction motors. While the motor shown may suitably be a multiphase squirrel cage induction motor, it will be evident that the motor rotor can be any suitable drive rotor as far as broad principles of the invention are concerned. The rotor 45 is rotatably mounted with respect to the output shaft 36 by rotor bearings 50, suitably ball or roller bearings, held in axial position by snap rings 51.

The wave generator rollers 20 which are used to deflect the flexcone 22 are mounted on crankarms 52. The crankarms 52 (of which a pair is shown) have tangs or stub shafts 53 which fit within concentric holes in the rotor and tangs or stub shafts 54 around which the wave generator rollers 20 are mounted and turn, having shiftable axes. Each roller 20 is held on the tang 54 by a snap ring 55 and each tang 53 is held within the conductor end 48 of the rotor by a tangent pin 56 in a groove 57 of the tang 53.

While plain rollers 20 can be used, the rollers 20 will preferably be of the ball bearing type having an inner race 58, rolling elements 60 and an outer race 61. On all the bearings shown, lubrication seals 62 are shown and these may be conventional in every respect.

A compensating action for change in torque is induced by having the center line or axis 63 (FIGURE 2) of the crankarm radially offset with respect to the axis 64 of the wave generator roller. The center line 64 of the wave generator roller is between the axis 65 of the output shaft and the axis 63 of each crankarm 52. Since the tang 53 makes a bearing fit in the hole in the conductor end 48, any torque applied to the output shaft 36 will cause a load to be placed upon the wave generator roller 20 and will tend to rotate each crankarm 52 around the crankarm axis 63. This will tend to increase the diameter and hence the pressure between the flexcone walls 24 and the groove 30 at the major axis since the element 23 is flexible and to some slight degree compressible and can be forced further into the circular groove 30 of the circular element 31.

FIGURE 2 illustrates the cross section of the device of FIGURE 1 and illustrates the relationships of the parts. The deflected shape of the flexible element 23 is illustrated. Since the diametral distance between the localities where the rollers 20 engage the flexcone is greater than the inner diameter of the flexcone end 23 when the latter is undeflected, the flexcone 22 assumes a shape which is elliptoidal in section when arranged over the rollers. It can be seen in FIGURE 2 that the centers of the rollers 20 are on the major axis of the elliptoid when no load or no output torque is applied.

Figure 3:
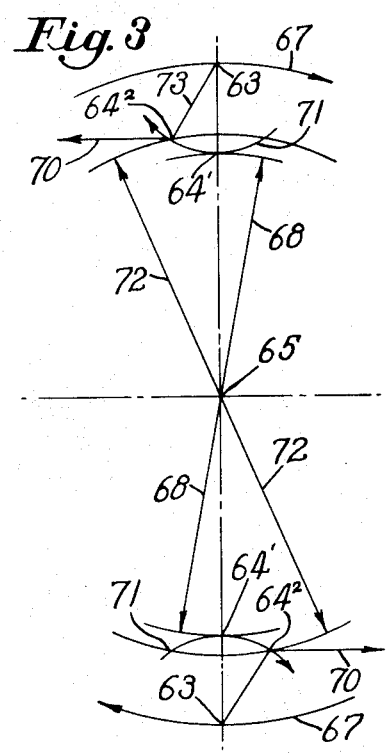
FIGURE 3 is a diagrammatic representation showing an increase in diameter of a wave generator and a flex element with the application of torque.

The center line 64 of the wave generator rollers and also the center line 63 of the crankarms 52 as shown in FIGURE 2 are on the major axis line 66. However, since the driving force or torque is applied at the crankarm centers 63, it will be evident that as this torque increases the crankarm centers 63 will no longer lie on a major axis line 66. This may be seen from FIGURE 3 which illustrates the shift of the center line 64 of the wave generator roller as the torque is applied to the output shaft. In FIGURE 3 the axis 63 of the crankarms is on the rotational path 67 of the tang 53 in the rotor. The rotational path 67 is intended to illustrate the successive points through which the axis 63 of the crankarms moves and the direction of such motion. Under the condition of zero torque, axis 64' of the wave generator rollers lies on the line connecting the center of the elliptoid (which corresponds to the axis 65 of the output shaft) with the axis 63 of the tang 53. In this position the center line 64' of the wave generator roller under zero torque is at a radius 68 from the output shaft axis 65. This radius 68 is the distance between the output shaft axis and the axis of the wave generator roller under zero torque conditions.

Now let us assume that torque is applied to the output shaft and this torque component is represented by an arrow 70 (FIGURE 3) applied at the center line of each wave generator roller. This will then cause the crankarms 52 to rotate through an angle which will depend upon the output torque, and swing through an arc 71. Arc 71 is then representing the motion of the roller center 64' under the action of the output torque 70. The new location of the axis of the wave generator roller will no longer lie between the axis 65 of the output shaft and the axis 63 of the tang 53. Thus axis $64^2$ of the wave generator roller is illustrated at the position that the roller will be under the action of the output torque 70. At this point the distance between the output shaft axis 65 and the wave generator roller axis $64^2$ will be increased and the new radius will be 72. Since the radius 72 is longer than the radius 68 and the difference in length is the result of the torque 70, it will be evident that the tendency of additional torque applied to the output shaft is to increase the distance between the opposite wave generator rollers and hence cause the frictional surfaces between the flexcone 22 and the inside of the circular element 31 to be more tightly held together.

Figure 4:
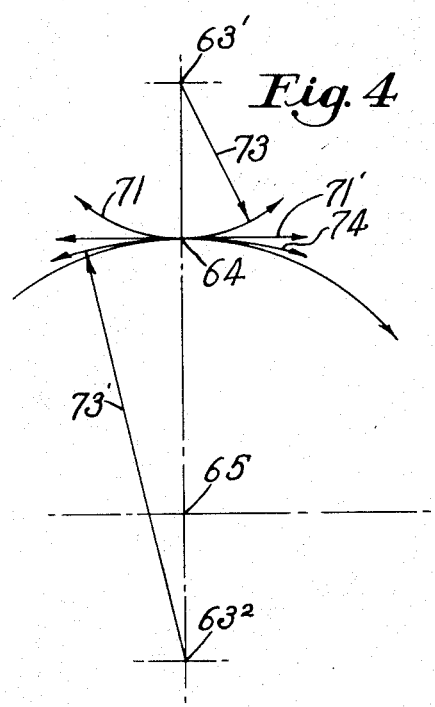
FIGURE 4 is a diagrammatic representation illustrating the effect of pivot position in the device of the invention.

In order to obtain this effect, in the particular embodiment shown, the center of the tang 53 of each crankarm 52 should lie outside the area between the axis 65 of the output shaft and the axis 64 of the wave generator rollers. If the axis 63 of the tang 53 were located somewhere between the axis 65 of the output shaft and the axis 64 of the wave generator rollers, the tendency would be to unload the frictional surfaces with the application of output torque. However, when the axis 63 of the crankarms lies outside of this region the action is to cause an increase in pressure between the frictional surfaces with the application of output torque. However, the axis 63 of the tang 53 can lie outwardly beyond the axis 64 of the wave generator roller or it can lie on the opposite side of the output shaft axis 65. This is illustrated in FIGURE 4 where the axis 63 is illustrated as 63′ when the axis of the eccentric lies outside of the axis 64 of the wave generator roller, and is illustrated as 63² when the crankarm axis lies beyond the output shaft axis 65. In FIGURE 4 the eccentricity illustrated as 73 will cause an arc which will be away from the curvature of the arc drawn from the output shaft axis 65. This arc 71 will cause a relatively rapid increase of the major axis with an application of torque. However, as the eccentricity 73 would be increased, the amount of action with a given amount of torque would be decreased until at infinity it would produce a straight line 71′ which would be the motion of the wave generator roller center.

If the eccentricity 73′ about the axis 63² were increased, this same straight line 71′ would eventually be produced for infinite eccentricity. As the eccentricity 73′ is decreased, it will generate an arc 74 which will lie on the other side of the straight line 71′. This particular configuration has value where frictional surfaces having a low coefficient of friction are used, or where it is desired to operate the device with the frictional surfaces fully lubricated.

Figure 5:
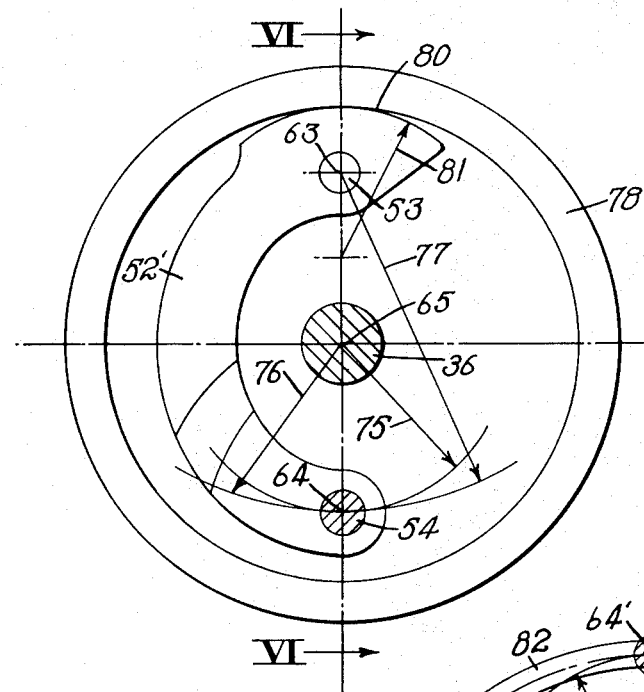
FIGURE 5 is a view similar to FIGURE 2 showing a modification in the device of the invention, being a section on the line V—V of FIGURE 6.

It will be seen by reference to FIGURE 5 that a radius 75 is the radius from the output shaft axis 65 of the wave generator roller axis at zero torque. A radius 76 is the radius from the output shaft axis 65 of the wave generator roller axis when a specific amount of torque is applied to the output shaft. Radius 76 is longer than radius 75 and as a consequence the major axis of the elliptoid will tend to be larger when torque is applied to the output shaft. Radius 76 is generated by arc 77 which is the actual eccentricity of each crankarm 52 under these conditions.

The wave generator when produced in this form has a certain degree of instability since the amount of force generated at the friction interfaces is high in relation to the output torque. This will be evident by examination of FIGURES 5 and 6 where the crankarms 52′ are shown (only one of the crankarms 52′ is shown for clarity in FIGURE 5). To avoid this condition and increase the stability, an annular metallic spring 78 has been placed around and in contact with curved shoe surfaces 80 at the outside of the crankarm adjacent the crankarm pivot 53. This tends to keep the crankarms in their neutral positions until a certain amount of output torque is applied. This spring 78 tends to return the crankarms 52′ to their neutral position when the output torque is removed.

In order that this ring spring can function in this manner, a radius 81 is drawn to a point somewhere between the crankarm axis 64 and the output shaft axis 65. This radius 81 will generate the arc 80 at one end of the crankarm 52′. Hence, when the ring spring 78 is sprung over the two crankarms 52′, they will tend to hold the axes 64 of the wave generator rollers along the vertical axis of FIGURE 5.

Figure 6:
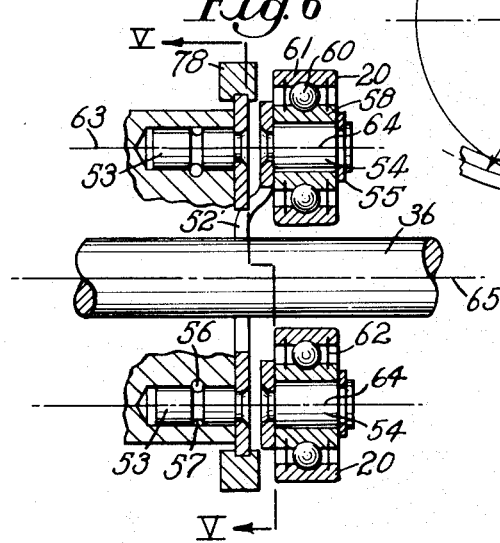
FIGURE 6 is a fragmentary section on the line VI—VI of FIGURE 5.

FIGURE 6 illustrates a cross section of FIGURE 5 with the relationship of the various parts made evident, the only difference from FIGURE 1 being that the position of the axis of the tang 53 of crankarm 52 is in a different location and the ring spring 78 is employed around the outside.

It can be seen that this self-compensating wave generator responds to an increase in the output torque to cause the frictional surfaces between the flexcone and the inside of the circular track 30 to be more tightly held together and in a sense self-locking. If it were designed so that the axis 63² of FIGURE 4 were on the axis 65 of the output shaft, then the arc swung by the eccentricity 73′ would lie directly on the arc generated by the axis of the output shaft and the compensating action would cease.

The diagrammatic views illustrate the amount of motion that would be produced by having the axis 63 of the tang 53 placed at various positions. In actuality, since the wave generator rollers are in contact with the flexcone 22 at all times, very little actual motion takes place. The only motion is in compressing the enlarged end 23 of the flexcone. However, it may be stated generally that in diagrams of this particular type where the largest amount of motion is illustrated, a given amount of torque or force will generate the smallest amount of force. Also, conversely, where the motion illustrated is the smallest, a given amount of output torque will produce the largest force tending to hold the frictional surfaces together. Therefore, in FIGURE 4, the arc 74 drawn from the eccentricity 73′ conforms much more closely with the arc generated around axis 65 and as a consequence illustrates a considerably small change in wave generator roller radius with a given amount of motion. The arc 74 will produce a considerably larger amount of force holding the frictional surfaces together than will be produced by the arc 71, and of course the arc or line 71′ will produce a force intermediate between the arc 71 and the arc 74.

FIGURE 5 illustrates a version where the axis 64 of the tang 53 lies on the other side of the axis 65 of the output shaft from the wave generator roller axis 64. This form has a very high self-locking tendency as the force created with a given amount of torque is very high.

Figure 7:
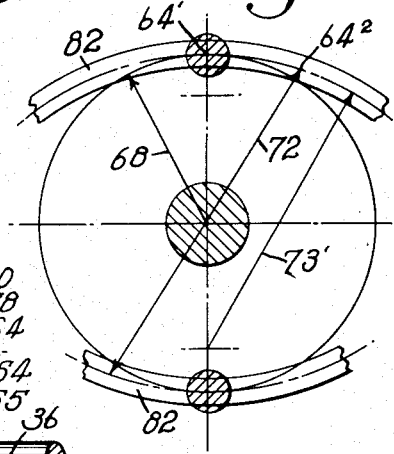
FIGURE 7 is a view similar to FIGURE 2 illustrating a further modification in the device of the invention.

While the entire discussion has referred to the crankarm mechanism to produce the desired action, it will be evident that the wave generator rollers can be mounted in cam slots 82 as shown in FIGURE 7 so that they can slide back and forth. The important thing to be considered is that as the output torque is increased, the distance between the rollers will tend to increase and that the proportion to be selected for a particular case will increase the frictional force between the wave generator elements to make them self-locking when an output torque is applied.

In view of my invention and disclosure variations and modifications to meet individual whim or particular need will doubtless become evident to others skilled in the art, to obtain all or part of the benefits of my invention without copying the structure shown, and I therefore claim all such insofar as they fall within the reasonable spirit and scope of my invention.

Having thus described my invention what I claim as new and desire to secure by Letters Patent is:

1. In a drive mechanism, a drive rotor, means for turning the drive rotor about an axis, a first element having a circular wall coaxial with the drive rotor, a flex element operatively engaging the circular wall of the first element at a plurality of circumferentially spaced points with intermediate points at which the flex element is out of engagement with the first element, the flex element being coaxial with the drive rotor, an output shaft interconnected with the flex element, and wave generator means mounted on the drive rotor and deflecting the flex element into contact with the first element at said points of contact, said latter means being responsive to torque applied to the output shaft for varying the pressure of the wave generator on the flex element to urge it against the first element.

2. A mechanism of claim 1, in which the wave generator means comprises link means pivotally mounting the wave generator means on the drive rotor.

3. A mechanism of claim 1, in which the wave generator means comprises rollers and link means pivotally mounting said rollers on said drive rotor.

4. A mechanism of claim 1, in which said wave generator means comprises crankarm means pivotally mounting the wave generator means on the drive rotor.

5. A mechanism of claim 1, in which the wave generator means comprises rollers, and crankarms pivotally mounted on the drive rotor and pivotally mounting the rollers, the pivotal axes of the crankarms on the drive rotor being located radially outwardly of the pivotal axis of the drive rotor.

6. A mechanism of claim 1, in which the wave generator means comprises rollers and crankarms having their respective pivotal axes in the drive rotor and having pivotal axes for the rollers, the pivotal axis of each crankarm in the drive rotor being located on the opposite side of the drive rotor axis from the pivotal axis of the roller on said crankarm.

7. A mechanism of claim 1, in which said wave generator means comprises crankarm means, in combination with spring means biasing said crankarm means to return to its neutral position.

8. A mechanism of claim 1, in which said wave generator means comprises crankarm means which has a crankarm axis and a shiftable axis for the wave generator means on the crankarm means, said axes for the crankarm and the shiftable axis for the wave generator means being on opposite sides of the drive rotor axis.

9. In a drive mechanism, a drive rotor rotatable on an axis, a first element having an internal circular wall coaxial with the drive rotor, a flex element within the first element in contact with the circular wall at a plurality of circumferentially spaced points and out of contact with the circular wall of the first element at intervening points, the flex element being coaxial with the drive rotor, wave generator means one for each point at which the flex element is in contact with the first element, located within the flex element and urging the flex element into contact with the first element, said latter means being responsive to torque applied to the output shaft and mounting the wave generator means on the drive rotor.

10. A mechanism of claim 9, in which the wave generator means comprises crankarm means having an axis in the drive rotor and having a shiftable axis for the wave generator means.

11. A mechanism of claim 10, in which the axis for the crankarm means in the drive rotor is located radially outward of the shiftable axis for the wave generator means.

12. A device of claim 10, in which the axis for the crankarm means on the drive rotor is located on the opposite side of the drive rotor axis from the shiftable axis for the wave generator means.

13. In a drive mechanism, a drive rotor turning on an axis, a first element having converging circular walls coaxial with said axis, a V shaped flex element within the first element engaging the circular walls of the first element at a plurality of circumferentially spaced points with intervening points at which the flex element is out of contact with the circular walls of the first element, said flex element being coaxial with the drive rotor, wave generator rollers, one for each point at which the flex element is in contact with the first element, located inside the flex element and deflecting the flex element into contact with the first element, and means mounting said rollers on the drive rotor.

14. A mechanism of claim 13, in which the means mounting the wave generator rollers on the drive rotor comprises torque responsive means.

15. A mechanism of claim 13, in which the means mounting the wave generator rollers on the drive rotor comprises torque responsive crankarm means having an axis on the drive rotor about which said crankarm means turns and an axis about which the rollers turn.

16. A mechanism of claim 15, in which the crankarm axis is radially outside the roller axis.

17. A mechanism of claim 15, in which the crankarm axis is on the opposite side of the drive rotor axis from the roller axis.

18. In a drive mechanism, an output shaft turning about an axis, a drive rotor rotating about said axis independently of the output shaft, a stationary first element having a V shaped internally circular wall coaxial with said axis, a flexcone interconnected with said output shaft and having a V shaped flex element which engages the V shaped circular wall of the first element at a pair of diametrally opposite positions interspersed with positions at which said flex element is out of contact with said circular wall of said first element, a pair of diametrally spaced torque responsive means respectively engaging the inside of said flexcone at the points at which said flex element is in contact with said first element, said torque responsive means including wave generator rollers on said drive rotor, and means for turning said drive rotor.

19. A mechanism of claim 18, in which said torque responsive means comprises crankarms mounting said wave generator rollers on said drive rotor, a portion of said crankarms having a shiftable wave generator roller axis.

20. A mechanism of claim 19, in which said crankarm axis is positioned radially outside said wave generator roller axis.

21. A mechanism of claim 19, in which said crankarm axis is located radially on the opposite side of said output shaft axis from said wave generator roller axis.

References Cited in the file of this patent

UNITED STATES PATENTS

| 622,207 | Collins | Apr. 4, 1899 |
| 2,293,407 | Schirrmeister | Aug. 18, 1942 |
| 3,039,324 | Waterfield | June 19, 1962 |

FOREIGN PATENTS

| 13,797 | Norway | Feb. 6, 1905 |
| 1,053,098 | France | Sept. 30, 1953 |